June 23, 1953   E. C. WADE   2,642,885
GYROSCOPIC VALVE CONTROL FOR HYDRAULIC CIRCUITS
Filed June 7, 1947

INVENTOR.
Elmer C Wade

Patented June 23, 1953

2,642,885

UNITED STATES PATENT OFFICE 2,642,885

GYROSCOPIC VALVE CONTROL FOR HYDRAULIC CIRCUITS

Elmer C. Wade, New York, N. Y.

Application June 7, 1947, Serial No. 753,235

4 Claims. (Cl. 137—38)

The invention relates to means for predetermining and maintaining directional disposition of an object subject to moments tending to change such disposition; and, broadly, the object is to provide new, simple, and reliable means for such purpose.

The invention more particularly contemplates the provision of a valve arranged to control hydrostatic pressure in a circuit including means, hydraulically controlled, for, say, resetting at an adopted disposition an object which has been moved from such disposition by other forces.

An example of a use of the invention is the application of the valve to the oil circuit embracing hydraulic jacks on a tractor provided for the purpose of raising and lowering a bulldozer blade. In preparing rough ground for, say, an airport, it is frequently desirable that the finished work result in a new earth surface conforming to a planar datum, usually horizontal. But almost always the ground selected for the work is not level, and the surface undulant. The job of the bulldozer is, of course, to cut away ground above the datum and to fill in ground below the datum. Heretofore the operator of a tractor carrying a bulldozer blade has been required to rely upon his vision and sense of balance to compensate for dips of the tractor by adjusting the blade. By means of the present invention the blade may be automatically constrained to maintain a proper and predetermined relationship with respect to the surface of the ground and with respect to the datum notwithstanding the dipping and pitching of the tractor, and such means dispense with the requirement that the tractor driver constantly watch the ground before him in order to be ready quickly to raise or lower the bulldozer blade, as the case may be, for the purpose of making a desired cut through the earth. Within limits the invention may be employed to maintain a bulldozer blade, or, strictly, the cutting edge thereof, in a predetermined position relative to a horizontal fore-and-aft datum line during undulant travel of the carrying tractor, with the result that the cut of such blade will tend to conform to a datum previously fixed.

The invention contemplates means for maintaining within a predetermined plane the path of travel of a variety of objects other than a bulldozer blade mounted on a tractor in many applications where means for resetting such object properly may be hydraulically controlled.

Further, the invention is useful in maintaining in preset position the disposition of nontraveling objects which are subject to moments tending to upset such disposition, as, for example, a barge, on which a derrick is at work eccentrically, tending periodically or continuously, but variously, to upset the trim of the barge. The invention is useful in this connection in that it may serve to control hydraulic ballast-shifting means automatically to compensate for moments resulting from the disposition and load of the derrick.

These and other objects will be more fully understood from the following description and the drawing.

Fig. 5 is a detail perspective view of the rotary valve body.

Figure 1:
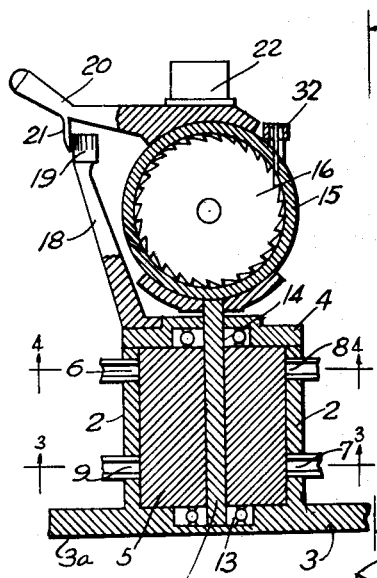
Fig. 1 is a horizontal sectional view showing the gyroscopic valve control device, minor parts being shown in elevation.

The valve shown in the drawing is, it will be understood, but one of a variety of valves contemplated by the invention. The valve shown is adapted for use in a circuit embracing a reservoir, a pump, and a hydraulic jack, as, for example, that class employed commonly on tractors for the purpose of raising and lowering a bulldozer blade.

The valve, proper, consists in a chamber 1, here shown as a short cylinder, having a cylindrical wall 2, a basal mounting plate 3, a top 4, and a valve body 5 which is shown in perspective in Fig. 5, and is more particularly described below, and six ports, 6, 7, 8, 9, 10, and 11. The valve body 5 is semi-cylindrical end construction, arranged to fit snugly but rotatably within the chamber 1, and is fixed upon a shaft 12 one end of which is seated in a bearing at 13 in the plate 3, the other end of which passes through a bearing at 14 in the top 4, and through the top 4 beyond the valve.

Fixed on the exterior end of the shaft 12 is a housing 15, containing two gyroscopes 16 and 17, suitably mounted therein. Gyroscope 16 has its axis disposed at ninety degrees to the axis of the shaft 12. The axes of the shaft 12, and of the gyroscope 16 intersect to define a common plane, as is clear from Fig. 2. This plane is maintained vertical by the combined pendulum effect of a second gyroscope 17 and by the operation of the gyroscopes 16 and 17 as will be brought out later herein. The axis of the gyroscope 16 intersects the axis of the gyroscope 17 at an angle of 90 degrees to define a common plane as is clear from Fig. 2. The axis of the gyroscope 17 also is perpendicular to the plane defined by the axes of the shaft 12 and of the gyroscope 17.

Extending angularly outwardly from the top 4 of the valve housing 2 is an arm 18 with an arcuate scale 19 on the outer end thereof. The outer face of the scale 19 is concentric with the shaft 12. A handle lever 20 is fixedly mounted on the outer end of the rotor housing 15 for the gyroscope 16, and a pointer 21 is provided on the arm 20 to overlie the scale 19 for indicating the relative rotative positions of the housing 2 and the gyro assembly and valve body 5 supported on the shaft 12. This lever arm 20 is of relatively light weight so as to produce no appreciable torque by gravity about the axis of the shaft 12.

Figure 7:
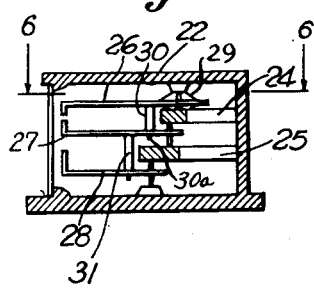
Fig. 7 is a sectional view taken along line 7—7 of Fig. 6.
Figure 6:
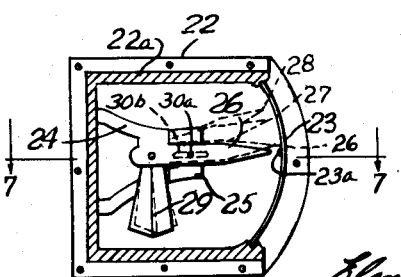
Fig. 6 is a vertical sectional view through the light level indicator taken along line 6—6 of Fig. 7.

Mounted on the outer side of the arm 20 is a sight indicator 22 to provide visual indication of the fore-and-aft position relative to the horizontal of the gyro and valve body assembly supported on the shaft 12. This sight indicator is shown diagrammatically in Figs. 1 and 2, and in detail in Figs. 6 and 7.

The indicator 22 comprises a box-like housing 22a having a cylindrically curved lens 23 mounted in an open side thereof. Two standards 24 and 25 are mounted on the side of the housing opposite the lens 23.

A first or master indicating needle 26 is pivoted between the housing 22a and the standard 24 with its axis of pivotal movement co-incident with that of the shaft 12. Two other needles 27 and 28 are pivotally mounted between the standards 24 and 25, and the standard 25 and the housing 22a, respectively, with their axes offset successively from that of the needle 26 and from each other in the direction of the lens 23.

A weighted pendulum 29 is affixed to the needle 26, and at right angles thereto. All of the needles 26, 27 and 28 are of negligible weight, and the pendulum 29 maintains the needle 26 horizontal. Needle 26 has a stud 30 secured to extend transversely therefrom, the stud 30 having a reduced end portion 30a which rides in a slot 30b indicated in dotted lines in Fig. 6, which extends lengthwise in the lever 28. Thus any relative displacement of the needle 26 to the housing 22 will be transmitted to the needle 27 to cause an increased angular displacement of the latter. The lever 27 is similarly connected by a post 31 to the third needle 28. Each of the indicating needles 26, 27 and 28 has a bent free end portion to aid visibility.

A usual lubber line 23a is provided transversely of the lens 23 to align with the free end of the needle 26 when the housing 22 is in level fore-and-aft position. In such position the free ends of the needles 27 and 28 also will be aligned with the needle 26 and with each other. Any tilting of the housing 22a from such level fore-and-aft position will cause the needle 26, maintained by the pendulum 29 in level fore-and-aft position, to depart from the lubber line 23a, and simultaneously, through the posts 30 and 31, to cause successively greater departures from the lubber line of the levers 27 and 28.

With the axis of the gyroscope 16 in a vertical plane, the housing 22a is designed to be level fore-and-aft of the dozer frame. In such position, therefore, the free ends of the three needles 26, 27 and 28 will be in alignment with each other and with the lubber line 23a.

Figure 3:
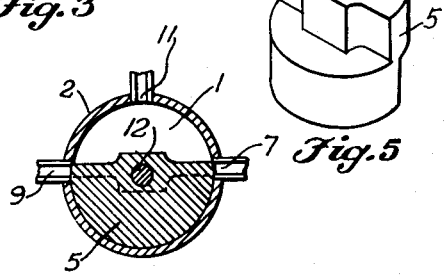
Fig. 3 is a transverse vertical sectional view, taken on line 3—3 of Fig. 1, looking in the direction of the arrows, showing the rotary valve body.
Figure 4:
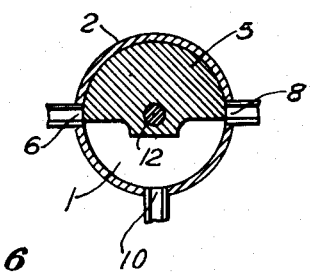
Fig. 4 is a similar view, taken on line 4—4 of Fig. 1, looking in the direction of the arrows.

If, in this condition of the visual indicator 22, the valve housing 2 is positioned with the pairs of ports 6 and 8, and 7 and 9 level, all four of these ports will be sealed off by the valve body 5 as shown in Figs. 3 and 4.

Without respect to the horizontality of the axis of the shaft 12, if the entire structure described is at rest, the three needles of the indicator 22 will be in alignment. The lens 23 may be calibrated so that a deadline thereon will indicate that the axis of gyroscope 16 is vertical and the axis of gyroscope 17 is horizontal. Such condition indicates that the shaft 12 is horizontal, and, as will be seen, all ports of the valve except 10 and 11 closed, but in this condition no passage of liquid is possible between ports 10 and 11, as will be made clear. If the bent ends of the three needles are seen to be aligned with each other and the calibrated deadline an operator is informed that the valve is disposed at a preferred datum from which adjustments may be made.

With reference now to Fig. 5 the valve body 5 is seen to be a solid semi-cylinder with the cutaway portion on one side at the top and on the other side at the bottom. See, also, Figs. 3 and 4, the first of which is a section of the upper half of the core, and the second of which is a section of the lower half. The adjectives "upper" and "lower" relate to the words "top" and "bottom," used above, quite arbitrarily, since the valve is usually so disposed that the axis of the shaft 12 is more or less horizontal; but, to facilitate reference to the drawing, these arbitrary terms have been adopted.

Figure 2:
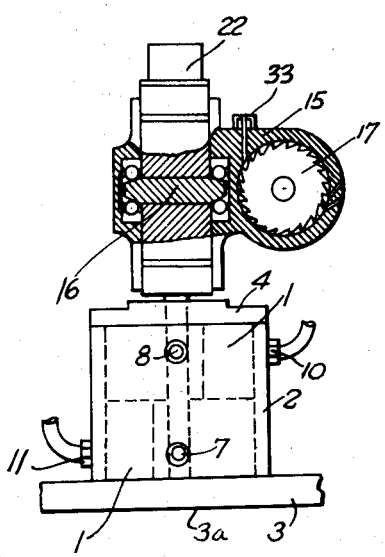
Fig. 2 is a side elevational view taken in the direction of the arrows 2—2 of Fig. 1, portions being broken away.

When the core 5 is positioned as shown in Figs. 2 and 3 the ports 6, 7, 8, and 9 are closed, the solid cylindrical portion of the core 5 covering the ports. However, the ports 10 and 11 are open. Now, for convenience, I have adopted 11 as the intake port, such port being the terminus of the hydraulic line from a pump, not shown; and I have adopted as an outlet port 10, opening into the line returning to reservoir, in any common hydraulic circuit. The other ports, in pairs, relate to the feed and return lines of, say, a hydraulic jack, or other hydraulic means.

Now, for the purpose of making clear one of the many applications of the invention I adopt an application of the valve, and its related parts, to the hydraulic circuit of a tractor equipped with a bulldozer blade and one or more jacks arranged to raise and lower the blade. In common practice such circuits are now manually controlled. The present invention seeks to render the manual control for the most part unnecessary.

The plate portion 3 of the valve housing 2 is mounted with its flat mounting surface 3a secured parallel to an upright longitudinal median plane through the combined tractor and dozer frame. The mounting plate 3 is attached to some convenient portion of the dozer frame, e. g., near and to the right hand side of the driver's seat. With the plate 3 thus mounted, the shaft 12 will extend transversely to a fore-and-aft median plane through the combined tractor and dozer frame, and the spin axes of the gyroscopes 16 and 17 will, therefore, be disposed parallel to such median plane.

Let it be assumed that the hydraulic circuit in which the valve operates is substantially as follows: From a hydraulic agent reservoir a line leads through a pump to port 11; from port 9 a line leads to one end of the cylinder of a hydraulic jack arranged to raise and lower the bulldozer blade; and from the other end of the cylinder a line leads back to port 8; and from port 10 a line returns to the reservoir. Again, from port 7 a line leads to that end of the cylinder of the jack from which the line to port 8 returns; and from the opposite end of the cylinder (the end connected directly to port 9) a line leads back to port 6.

If the valve is positioned as shown in Figs. 3 and 4, the jack is incapable of operating, since the port 11, having head pressure, while opened in the sense that the fluid agent may fill the semi-cylindrical reservoir in the upper part of the chamber 1 (see Fig. 3), is closed with respect to the other ports due to the arrangement of valve body 5 (see Fig. 5). Now, if the shaft 12 is rotated in a direction equivalent to counterclockwise in either Fig. 3 or 4, port 9 and port 8 are opened. The pressure in the line then is as follows: through 11, out 9, through the jack, back through 8, and out 10 to reservoir. Let it be said that this effects to operate the jack to raise the bulldozer blade. Now, if the shaft 12 is rotated in a direction equivalent to clockwise in either Fig. 3 or 4, port 7 and port 6 are opened. The pressure in the line is then as follows: through 11, out 7, through the jack, back through 6, and out 10 to reservoir. If the gyroscopic arrangement were wholly absent it is clear that by means of the handle 20 the raising and lowering of the blade could be accomplished manually, and, as a safety measure, the handle 20 may be employed for emergency positionings of the blade.

The mechanism of the present invention operates to maintain the dozer frame in a substantially level fore-and-aft position regardless of fore-and-aft tilting or pitching of the tractor upon which the dozer frame is mounted. Before starting a bulldozing operation, the gyroscopes 16 and 17 are brought up to proper rotative speed by admitting fluid under pressure, for example, compressed air through the jet orifices 32 and 33.

The weight of the gyroscope 17 and its housing 15, being below the shaft 12, exerts a pendulum-like effect upon the entire assembly mounted on the shaft 12. This pendulum effect tends to maintain the axis of the gyroscope 16 in a vertical plane even when the gyroscopes are at rest. This pendulum effect also tends to prevent precessing of the gyroscopes 16 and 17 due to earth rotation.

In manipulating the tractor between dozing operations, the dozer frame may be elevated by manually operating the lever 20, and the gyroscopes 16 and 17 then tend to maintain the dozer frame in any such pre-set position. When the dozer is to be used to make a straight cut to the established datum line however, the lever 20 is manipulated to bring the ends of the three level indicating arrows 26, 27 and 28 of the device 22 in line with each other on the lubber line 23a as explained previously herein.

If, due to upward or downward tilting of the tractor and dozer frame during a dozing operation, the housing 2 is tilted in either a clockwise or counterclockwise direction relative to the valve body 5 from the position shown in Figs. 3 and 4, the two ports 6 and 8 or 7 and 9 will be opened by such relative movement. The opening of either the ports 6 and 7 or the ports 8 and 9 will, as previously explained herein, open a hydraulic circuit to the dozer frame actuating jack, not shown. The jack will tilt the dozer frame, and thereby the housing 2 back to the relative positions shown in Figs. 3 and 4. In such position the valve body 5 again will close the aligned pairs of ports 6 and 8 and 7 and 9, and will retain them closed until the dozer frame again is displaced from a horizontal fore-and-aft condition.

With the gyro and valve body assembly supported on the shaft 12 disposed with the axis of the gyroscope 16 in a vertical plane, the shaft of the gyroscope 17 horizontal, and the dozer frame and its supported housing 2 horizontal, the dozer cut may be begun. The gyroscopes 16 and 17 will maintain the shaft of the gyroscope 16 in a vertical plane in spite of any lateral tilting of the tractor, and any fore-and-aft tilting of the dozer frame, and its supported valve housing 2, will open the necessary ports 6 and 7 or 8 and 9 as the case may be to maintain the dozer frame in substantially level fore-and-aft condition.

The sight level indicator 22 provides a constant visual check on the fore-and-aft horizontality of the valve housing 2, and thereby of the dozer frame, and any deviation therefrom may be easily corrected by manipulation of the lever 20.

While I have illustrated and described a preferred embodiment of the present invention, it will be understood however, that various changes and modifications may be made in the details thereof without departing from the spirit and scope of the invention as set forth in the appended claims.

Having described my invention, what I claim is:

1. A gyroscopic valve control for hydraulic circuits (such circuits generally utilizing a hydraulic jack) and having a pressure fluid inlet port and a return fluid outlet port; said valve comprising a valve chamber of cylindrical form having a plurality of inlet ports and a plurality of outlet ports leading to the jack, a valve body of generally cylindrical form fitted rotatively in said valve chamber, said valve body having a semi-cylindrical portion on each end thereof to provide fluid chambers, said semi-cylindrical portions being arranged in predetermined relative rotative positions to simultaneously close all ports leading to and from said jack and to keep open said pressure fluid inlet port and return fluid outlet port, a shaft secured to said valve body to rotate therewith, means operable exteriorly of the cylinder for turning said shaft and said valve body relative to the cylinder to expose predetermined ones of said inlet and outlet ports leading to the jack, gyroscopic stabilizing means mounted on the shaft to maintain said shaft in a pre-set position, and indicating means associated with the cylinder for indicating changes in rotative displacement of the cylinder relative to the valve body and the gyroscopic control means.

2. In combination, a cylindrical valve chamber, a valve body rotatively mounted in said chamber, said valve body having a semi-cylindrical portion on each end thereof, said semi-cylindrical portions being disposed oppositely to each other, said chamber having a pair of ports disposed to be covered by, and adjacent opposite edges of each semi-cylindrical portion in a predetermined relative rotative position of the chamber and valve body, pressure fluid supply means connected to open into the space between one semi-cylindrical member and said valve chamber, an exhaust port from the space between the other semi-cylindrical member and said valve chamber, a shaft for turning said valve body, a first gyroscopic rotor mounted to turn with said shaft, a second gyroscopic rotor mounted to turn with said shaft and disposed with its spin axis in the same plane as that of said first gyroscopic rotor, means for supplying energy to said rotors to maintain them at constant speeds, and level indicating means associated with said valve body.

3. In combination, a cylindrical valve chamber, a valve body rotatively mounted in said chamber, said valve body having a pair of separate recesses therein, said chamber having a pair of ports disposed to be covered by said valve body and adjacent opposite edges of each recess in a predetermined relative rotative position of the chamber and valve body, pressure fluid supply means connected to open into one of said recesses, exhaust means connected to open into the other of said recesses, a shaft for turning said valve body, a first gyroscopic rotor mounted to turn with said shaft, a second gyroscopic rotor mounted to turn with said shaft and disposed with its spin axis in a common plane with that of said first gyroscopic rotor, means for supplying energy to said rotors to maintain them at constant speeds, and level indicating means associated with said valve body.

4. In combination, a cylindrical valve chamber, a valve body rotatively mounted in said chamber, said valve body having a pair of separate recesses therein, said chamber having a pair of ports disposed to be covered by, and adjacent opposite edges of each recess in a predetermined relative rotative position of the chamber and valve body, pressure fluid supply means connected to said valve chamber to open into one of said recesses, an exhaust port from the other of said recesses, a shaft mounted coaxially of said chamber for turning said valve body, a first gyroscopic rotor mounted with its spin axis at right angles to the axis of said shaft and in a common plane therewith to turn with said shaft, a second gyroscopic rotor mounted with its spin axis at right angles to that of the first gyroscopic rotor and in a common plane therewith, to turn with said shaft and disposed with its spin axis in the same plane as that of said first gyroscopic rotor, means for supplying energy to said rotors to maintain them at constant speeds, and level indicating means associated with said valve body.

ELMER C. WADE.

References Cited in the file of this patent

UNITED STATES PATENTS

| Number | Name | Date |
|---|---|---|
| 367,659 | Pennock | Aug. 2, 1887 |
| 1,096,254 | Lang | May 12, 1914 |
| 2,472,944 | Furer | June 14, 1949 |

FOREIGN PATENTS

| Number | Country | Date |
|---|---|---|
| 475,888 | France | June 21, 1915 |
| 500,840 | Great Britain | Feb. 16, 1939 |